(12) United States Patent
Uta et al.

(10) Patent No.: US 7,890,118 B2
(45) Date of Patent: Feb. 15, 2011

(54) METHOD, SYSTEM AND APPARATUS FOR DETECTING A POSITION OF A TERMINAL IN A NETWORK

(75) Inventors: Takaki Uta, Kodaira (JP); Atsushi Ogino, Kodaira (JP); Ryota Yamasaki, Kokubunji (JP); Kumiko Takikawa, Tama (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 11/268,527

(22) Filed: Nov. 8, 2005

(65) Prior Publication Data

US 2006/0105779 A1 May 18, 2006

(30) Foreign Application Priority Data

Nov. 12, 2004 (JP) ............................. 2004-328366

(51) Int. Cl.
*H04W 24/00* (2009.01)

(52) U.S. Cl. .............. 455/456.1; 455/456.2; 455/456.5; 455/456.6

(58) Field of Classification Search .............. 455/402.2, 455/456.1–456.6, 561.1
See application file for complete search history.

(56) References Cited

U.S. PATENT DOCUMENTS

| 5,581,804 | A | * | 12/1996 | Cameron et al. | .......... 455/456.1 |
| 6,163,696 | A | * | 12/2000 | Bi et al. | ....................... 455/436 |
| 6,853,847 | B2 | * | 2/2005 | Shioda et al. | ............. 455/456.1 |
| 6,944,454 | B1 | * | 9/2005 | Lee et al. | ..................... 455/443 |
| 6,944,466 | B2 | * | 9/2005 | Bi et al. | ................... 455/456.1 |
| 6,973,316 | B1 | | 12/2005 | Hayakawa | |
| 2001/0034238 | A1 | | 10/2001 | Voyer | |
| 2004/0046693 | A1 | | 3/2004 | Ogino et al. | |
| 2004/0235472 | A1 | * | 11/2004 | Fujishima et al. | ........... 455/434 |

(Continued)

FOREIGN PATENT DOCUMENTS

JP 10-257546 9/1998

(Continued)

OTHER PUBLICATIONS

Office Action from Japanese Patent Office dated Jan. 26, 2010, in Japanese with partial English translation.

(Continued)

*Primary Examiner*—Vincent P Harper
*Assistant Examiner*—Dung Lam
(74) *Attorney, Agent, or Firm*—Stites & Harbison, PLLC; Juan Carlos A. Marquez, Esq

(57) ABSTRACT

In a position detection system utilizing a WLAN supporting multiple data transfer rates, it is possible to reduce the number of required installed base stations, so system construction costs can be lowered. In a wireless station, a transmitted signal is judged at the time of transmission, and in case it is normal user data, the signal is transmitted by setting optimal transmission parameters for which a high communication throughput with wireless communication is obtained, and in case it is a position detection signal, the aforementioned signal is transmitted by setting transmission parameters for which the service range is increased. As a transmission parameter for which the service range is increased, a low data transfer rate or a long preamble length is used.

8 Claims, 11 Drawing Sheets

U.S. PATENT DOCUMENTS

| | | |
|---|---|---|
| 2005/0020206 A1* | 1/2005 | Leeper et al. ............... 455/41.2 |
| 2005/0068169 A1* | 3/2005 | Copley et al. .......... 340/539.13 |
| 2005/0078033 A1 | 4/2005 | Tamaki et al. |
| 2005/0078626 A1 | 4/2005 | Ogino et al. |
| 2005/0090268 A1* | 4/2005 | Yamasaki et al. ........ 455/456.5 |
| 2005/0099942 A1 | 5/2005 | Kurihara |
| 2005/0101331 A1 | 5/2005 | Tamaki et al. |
| 2008/0119185 A1 | 5/2008 | Saito et al. |

FOREIGN PATENT DOCUMENTS

| | | |
|---|---|---|
| JP | 2000-151639 | 11/1998 |
| JP | 2001-69555 | 8/1999 |
| JP | 2001-112047 | 4/2001 |
| JP | 2001-313973 | 11/2001 |
| JP | 2004-101254 | 9/2002 |
| JP | 2004-85545 | 3/2004 |
| JP | 2004-289815 | 10/2004 |

OTHER PUBLICATIONS

Office Action from Japanese Patent Office for Japanese Patent Application 2007-277075 mailed Apr. 13, 2010.

* cited by examiner

METHOD, SYSTEM AND APPARATUS FOR DETECTING A POSITION OF A TERMINAL IN A NETWORK

INCORPORATION BY REFERENCE

The present application claims priority from Japanese application JP2004-328366 filed on Nov. 12, 2004, the content of which is hereby incorporated by reference into this application.

BACKGROUND OF THE INVENTION

The present invention pertains to a system which detects, by wireless communication, the position of a terminal in a wireless communications system based on Wireless LAN.

Technologies for measuring the position of a terminal in a wireless system are proposed. There is e.g. proposed a method of detecting the position of a terminal wherein the differences in propagation distance from the terminal to each base station are computed by calculating the time differences of receiving a signal transmitted by the terminal at base stations installed in known positions and multiplying the time differences by the speed of light (For example, US2004/0046693A1).

SUMMARY OF THE INVENTION

WLAN (Wireless Local Area Network), specified in the IEEE 802.11a/b/g standards or the like, has gained wide acceptance for reasons such as being inexpensive and easy to install and yet requiring no license. Also, position measurement systems utilizing these WLAN have been considered. As an example of a WLAN-based position detection system, there is US2004/0046693A1. Compared to GPS (Global Positioning System) which has gained acceptance as a position detection system, WLAN-based position detection systems, since they have a higher radio bandwidth than GPS, have the characteristics of making it possible to obtain higher detection accuracy than for GPS as well as enabling position detection even in indoor environments with no reception of GPS radio waves.

FIG. 2 shows an example of a position detection system utilizing WLAN. It is composed of a base station 1, a base station 2, and a base station 3, as well as a server and a terminal. Base stations 1 to 3 (204a to 204c) and the server are connected to a wired network. The terminal is connected to the base stations by wireless communication.

In FIG. 11, the flow of a conventional WLAN position detection system is shown. The terminal requests a position detection of itself to the server via base station 204a, a base station to which connection is possible, normally that closest to the terminal. The server instructs base station 204a, which forwarded the aforementioned request, and base stations 204b and 204c in the periphery thereof, to monitor a frequency channel used for position detection. Each base station having received the aforementioned monitor command respectively returns a reply to the server. Subsequently, the server requests the terminal, via base station 204a which had forwarded the aforementioned request, to transmit a second wireless packet on the frequency channel. On that occasion, it comes about that base station 204a transmits a wireless packet on the aforementioned frequency channel, as mentioned above. Further, in the drawing, only two peripheral base stations, base stations 204b and 204c, have been illustrated, but it is desirable to utilize three or more peripheral base stations in order to specify a position based on the principle of trilateration. Here, a base station connected to the terminal and two other base stations, three in total, are ensured, but three or more base stations other than the base station connected to the terminal may be used as base stations for measuring the reception timing. In case the number of base stations which can be used for the measurement of reception timing is two or fewer, some kind of approximation is required to specify the position of the terminal.

Taking this to be the first wireless packet, base station 204a measures the transmission timing thereof. Next, the terminal transmits a second wireless packet on the frequency channel. The base stations instructed to monitor respectively measure the reception timing of the packets. Each base station communicates to the server the measured results of the reception timing or the transmission timing of each wireless packet. The server calculates the position of the terminal on the basis of the time differences of the timing of receiving the signal transmitted from the terminal, at the base stations installed at known positions. The server communicates the measured position to the terminal.

An explanation will be given of the method of computing the position of the terminal. First, the errors $E_{b0\_bi}$ (i=1, 2) of the clocks of base stations 204b, 204c with respect to base station 204a are obtained by Eq. 1. Next, the aforementioned obtained clock errors are substituted in the simultaneous equations (i=1, 2) shown in Eq. 2, and, by solving for the position $(X_m, Y_m)$ of the terminal, the position is found. Here, $T_{p1\_b0}$ and $R_{p2\_b0}$ are the transmission timing of the first wireless packet and the reception timing of the second wireless packet, measured at base station 204a. $R_{p1\_b1}$ and $R_{p2\_b1}$ are the reception timings of the first and the second wireless packets, measured at base station 204b. $R_{p1\_b2}$ and $R_{p2\_b2}$ are the reception timings of the first and the second wireless packets, measured at base station 204c. $(X_0, Y_0), (X_1, Y_1)$, and $(X_2, Y_2)$ are the respective positions of base stations 204a, 204b, and 204c. The constant c is the speed of light.

$$E_{b0\_bi} = R_{p1\_bi} - T_{p1\_b0} - c^{-1}\{(X_i - X_0)^2 - (Y_i - Y_0)^2\}^{1/2} \quad \text{(Eq. 1)}$$

$$\{(X_m - X_i)^2 - (Y_m - Y_i)^2\}^{1/2} - \{(X_m - X_0)^2 - (Y_m - Y_0)^2\}^{1/2} = \quad \text{(Eq. 2)}$$
$$c(R_{p2\_bi} - E_{b0\_bi} - R_{p2\_b0})$$

In generally disseminated WLAN systems, the terminal and the base station to which it is connected select optimal transmission parameters so that, in response to the distance and the propagation environment, the communication bandwidth becomes a maximum. As transmission parameters, there are the data transfer rate and the preamble length. E.g., in the IEEE 802.11b WLAN standard, it is possible to select a data transfer rate in the range from 1 M to 11 Mbps, and two kinds of preamble lengths. The higher the data transfer rate is, or the shorter the preamble is, the higher the communication throughput becomes. However, there is the characteristic that the service range then becomes shorter.

In this way, transmission parameters such as the data transfer rate and the packet length are closely related to the service range of the packets, but in conventional position detection systems, no investigation is performed with respect to the communication parameters, the result being that communication parameters are selected in response to the propagation path conditions between the terminal and the adjacent base station 204a. Because of that, there arise problems such as those which will be subsequently described.

Using FIG. 3, an explanation will be given of problem areas arising in the case of applying a conventional WLAN system to a system having multiple data transfer rates with different ranges. E.g., as shown in FIG. 3, it is assumed that terminal 203 is in the proximity of base station 204a. Here, 301a indicates the service range of radio signals for the highest data transfer rate at which the base station transmits. Further, 302a indicates the service range of the highest data transfer rate radio signals transmitted by the terminal. Base station 204b and base station 204c, which are utilized for position detection, are outside the zone of communication service ranges 302a and 302b for high-speed data transfer rates.

From the fundamental requirements of position measurements by position detection systems using WLAN, it is necessary to have multiple base stations to receive the respective signals of base station 204a and terminal 203. However, if the normal communication protocol is followed, since base station 204a and terminal 203 are mutually within the range associated with the highest-speed data transfer rate, the high-speed data transfer rate is selected. In that case, since base stations 204b and 204c, installed for the purpose of position detection, are outside the radio wave service range associated with high-speed data transfer rate communication by the former, the latter fail to receive the signals needed for position detection, so it is not possible to detect the position.

For that reason, it is imperative, considering as point of reference the data transfer rate for which the radio wave service range is the narrowest and the speed is the highest, to install a plurality of base stations within the range thereof, in order that the position can be detected even when the terminal is in the proximity of the base station.

The aforementioned explanation was made with a focus on the data transfer rate, but the situation is similar regarding the preamble length or the transmitted power. Specifically, there are cases where signals transmitted from the terminal with a preamble length or transmitted power which is optimal to adjacent base station 204a cannot be received with sufficient quality at the peripheral base stations.

In this way, there has been a problem of proliferation of base stations in position detection systems using a WLAN supporting multiple data transfer rates, there being no mechanism conventionally for controlling transmission parameters such as the data transfer rate of the packets for position detection. Accordingly, the object of the present invention is, by taking into consideration the aforementioned problem, to reduce the required number of base stations to thereby a reduce the system construction costs.

In FIG. 3, 301b indicates the service range of radio signals for the lowest data transfer rate at which the base station transmits. Also, 302b indicates the service range of radio signals for the lowest data transfer rate at which the terminal transmits. Base station 204b and base station 204c, utilized for position detection, are outside the range of service ranges 302a and 302b for communication at high-speed data transfer rates, but they can be installed within service ranges 301b and 302b for radio signals at the lowest data transfer rate. Consequently, in case base station 204a and the terminal communicate at the mutually lowest-speed data transfer rate, the reception of signals is successful since base stations 204b and 204c in FIG. 3 are within the range of 302b.

The feature of the present invention resides in that a signal is identified in the base station at the time of transmission and, in case it is normal user data, it is transmitted at the optimal data transfer rate taking into account the service range of the radio signals or it is transmitted with a short preamble length with low overhead and, in case it is a signal for position detection, it is transmitted with low data transfer rate or long preamble length parameters.

Also, in an IEEE 802.11 WLAN, an exchange of packets is carried out wherein the station having received a unicast packet returns an acknowledgment (ACK) packet. At this point, the side transmitting the ACK packet replies with the same data transfer rate as that of the unicast packet. The present invention is characterized in that, in measurement packet 1 and measurement packet 2, the unicast packet is transmitted with low data transfer rate or long preamble length parameters by using the unicast packet and the ACK packet corresponding to the aforementioned unicast packet.

According to the present invention, it is possible to implement a communication area which is wider than for normal data communications, by transmitting a signal for position measurement using a low data transfer rate or a long preamble length. As a result, it is possible to reduce the number of required base stations in a position detection system using a WLAN supporting high-speed data transfer rates. As for the relationship between the radio signal distance and attenuation, there is a square-root law wherein the attenuation is inversely proportional to the square of the distance in free space. In an indoor environment, through the influence of the dependence on the peripheral environment with reflective objects and the like, it is difficult to express attenuation with a rigorous formula like a square-root law, but there is an empirically obtained cubic-root law wherein the attenuation is inversely proportional to the cube of the distance.

In case the cubic-root law is used provisionally, if the difference in the receiver minimum input level sensitivity of the lowest data transfer rate and the highest data transfer rate is 9 dB, the ratio of the service ranges in an indoor environment works out to 2. In this case, by using the present invention, it is possible to double the spacing of base stations for position detection and to reduce the number of base stations per unit area to ¼.

As described above, with the present invention, it is possible, in a position detection system applying a high-speed WLAN supporting multiple data transfer rates, to reduce the number of required installed base stations, so system costs can be lowered. Since a position detection system based on WLAN can detect positions in indoor environments with no reception of GPS radio waves, or with higher accuracy than GPS, it can be considered for uses like goods handling in logistical warehouses and the like.

Other objects, features and advantages of the invention will become apparent from the following description of the embodiments of the invention taken in conjunction with the accompanying drawings.

DESCRIPTION OF THE EMBODIMENTS

Aspect 1

Figure 1:
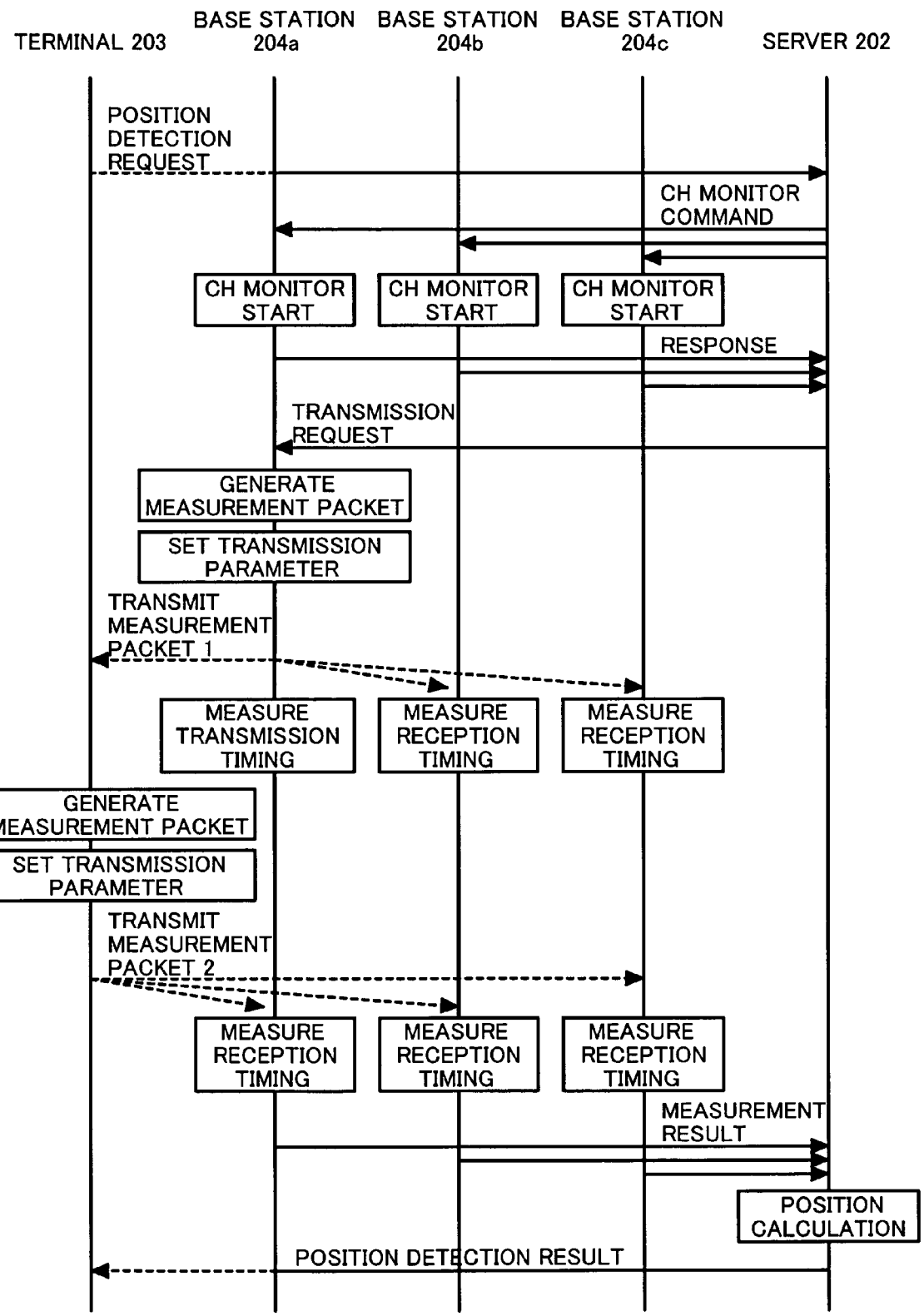
FIG. 1 is a diagram showing the system flow in the first embodiment of the present invention.
Figure 2:
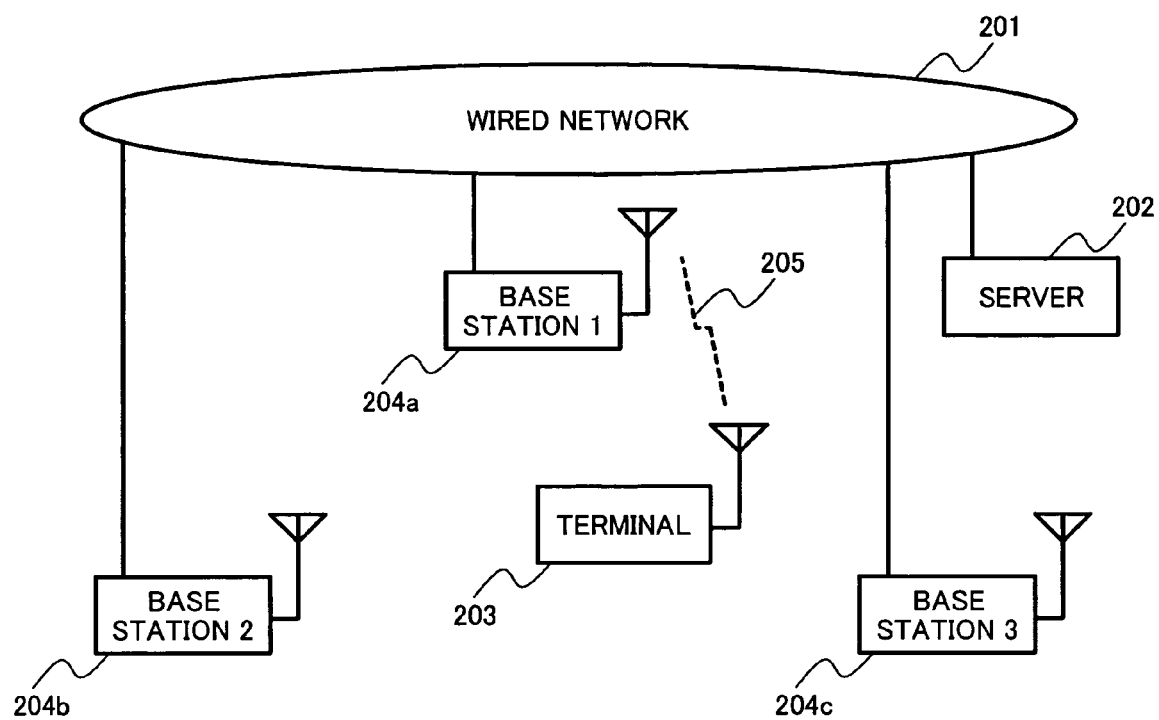
FIG. 2 is a diagram showing an example of a position detection system based on WLAN.
Figure 3:
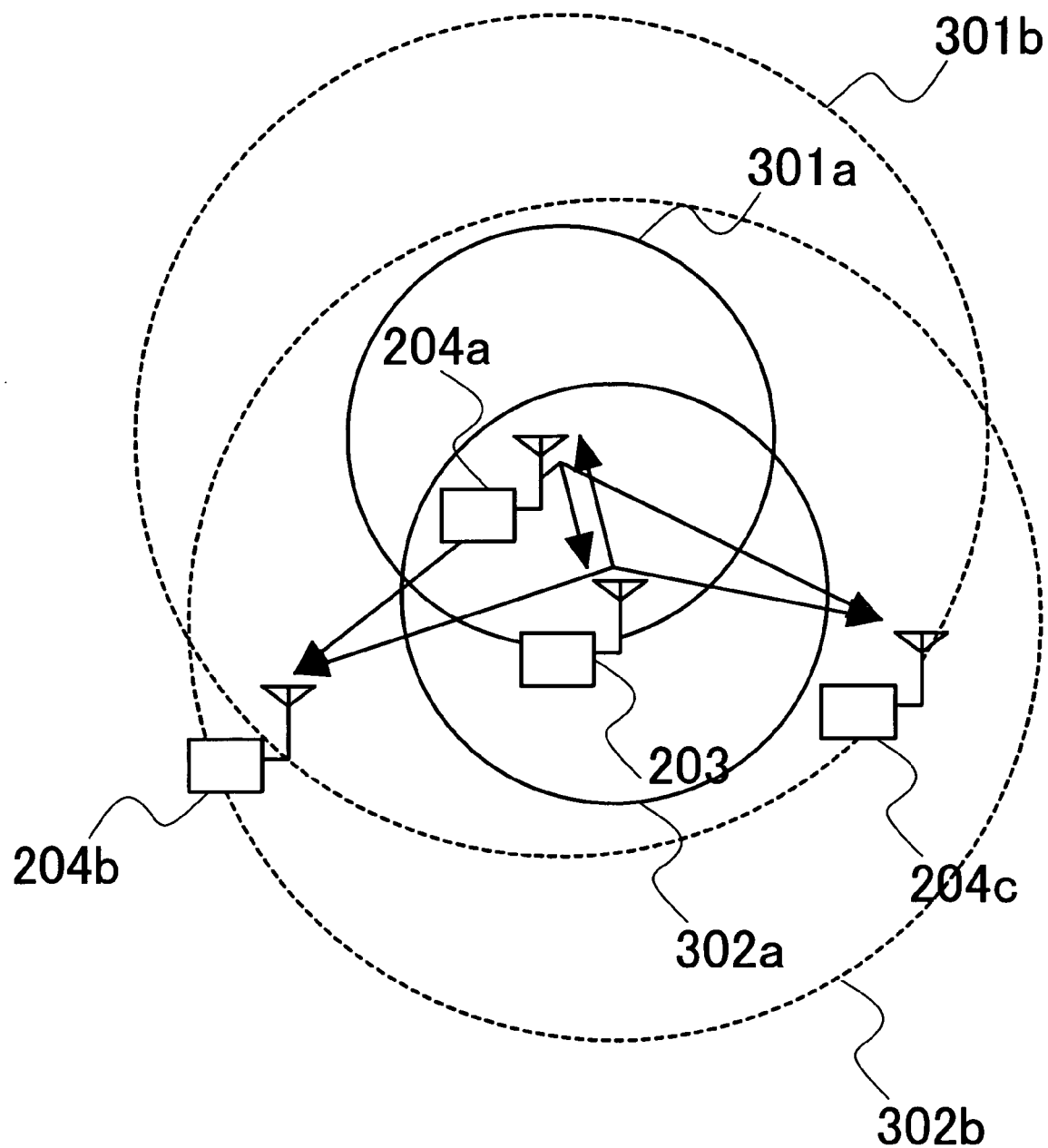
FIG. 3 is a diagram giving an explanation regarding base station spacing in a WLAN position detection system having multiple data transfer rates.

Hereinafter, the aspects of the present invention will be described on the basis of the accompanying drawings. The structure of the whole position detection system is similar to that of the conventional system shown in FIG. 2. In FIG. 1, the flow of a WLAN position detection system of the present invention is shown. A terminal requests a position detection of itself to a server 202 via a base station 204a, to which connection is possible, normally that closest to the terminal. Server 202 instructs base station 204a, which forwarded the aforementioned request, and base stations 204b and 204c in the periphery thereof, to monitor a frequency channel used for position detection. Each base station having received the aforementioned monitor command respectively returns to server 202s a reply with respect to the monitor command.

Subsequently, server 202 requests the terminal, via base station 204a, which had forwarded the aforementioned request, to transmit a measurement packet 1. Base station 204a generates measurement packet 1. Base station 204a transmits the generated measurement packet 1, after setting the parameters of the position measurement packet. As settings for the position measurement parameters, settings with a long service range are preferred. Specifically, in the case of IEEE 802.11, settings which minimize the data transfer rate or which make the preamble length long are chosen. Generally, the transmitted power in WLAN such as those based on IEEE 802.11 is fixed, but in case this power can be controlled in timing, the maximum transmitted power may be chosen.

When transmitting measurement packet 1, base station 204a measures the transmission timing of the measurement packet. Measurement packet 1 goes through the frequency channel and arrives at the terminal or a peripheral base station. Base stations 204b and 204c, having received measurement packet 1, measure the reception timing of measurement packet 1.

The terminal, after having received measurement packet 1, generates a measurement packet 2 in response to this and, after having made the setting of the transmission parameters, it transmits the packet on the frequency channel. In the same way as for the base station side, transmission parameter settings on the terminal side for which the service range is long are preferred.

The base stations having received the aforementioned monitor command respectively measure the reception time of measurement packet 2 and communicate the results measured for the reception time or the transmission time of each wireless packet to the server. The server performs a position calculation from the transmission times and communicates the result to the terminal.

Regarding the details of the technique for calculating the position from the time differences at transmission and reception, an explanation will be omitted because it falls outside the scope of the substance of the present invention, but the details are set out in US2004/0046693A1, a previous application by the applicants of the present application. Also, even for calculation methods other than that, as long as the system is one wherein a signal transmitted by a base station or a terminal is received at multiple wireless stations (stations for performing both position measurement communications and normal communications) and used for position measurement, other calculation methods are acceptable.

Figure 4:
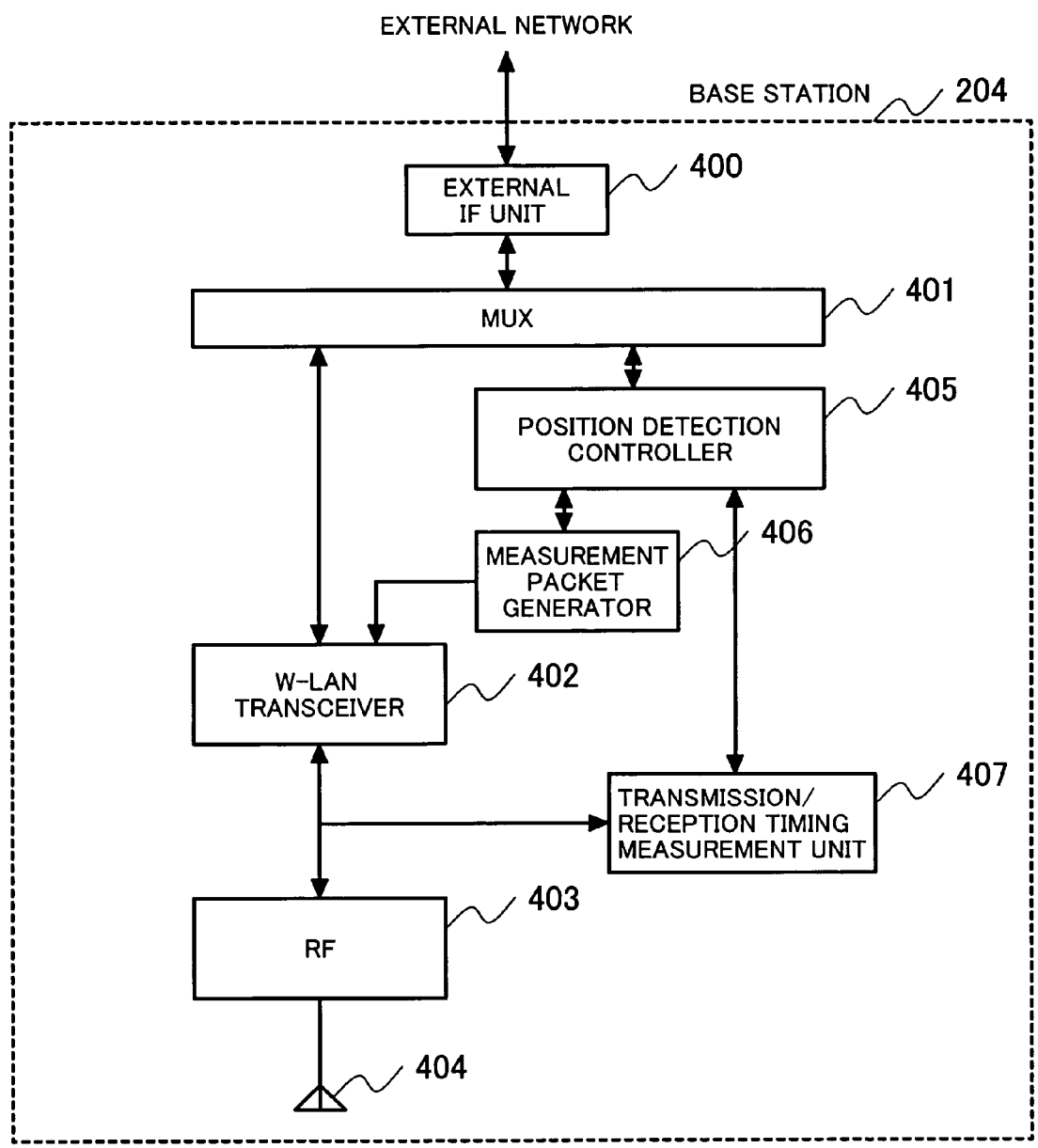
FIG. 4 is a diagram showing a configuration example for the base station of the present invention in FIG. 1.

In FIG. 4, an example of a configuration of a base station of the present invention is shown. An external IF (interface) unit 400 is a block processing the communications interface with the external network connecting the base station and the server. A MUX (multiplexing) unit 401 is a block which either distributes signals coming from the external IF unit to a WLAN transceiver 402 or a position detection controller 405 or works in the reverse mode. WLAN transceiver 402 is a block performing the signal processing of the MAC (Medium Access Control) layer or the physical layer of the WLAN. An RF (Radio Frequency) unit 403 is a block performing conversions between baseband signals and radio frequency wireless signals.

In case normal user data are sent from the external network side towards the terminal, the resulting flow of the data in the internal part of the base station is through external IF unit 400, MUX unit 401, WLAN transceiver 402, RF unit 403 and an antenna 404.

Position detection controller 405 is a block governing the control of blocks related to communication with the server and position detection inside the base station. In case there is a request from the server to transmit a position measurement packet, position detection controller 405 gives instructions for the generation of a packet to a measurement packet generator 406 and for a transmission timing measurement to a transmission/reception timing measurement unit 407, respectively.

Measurement packet generator 406 generates a measurement packet and sends the packet to WLAN transceiver 402. The sent packet is modulated in WLAN transceiver 402, raised to radio frequencies in RF unit 403, and transmitted from antenna 404. Transmission/reception timing measurement unit 407 takes as an input the signal between WLAN transceiver 402 and RF unit 403 to measure the transmission/reception timing.

The processing of each block may be implemented in hardware, software or a mixture of the two.

Figure 5:
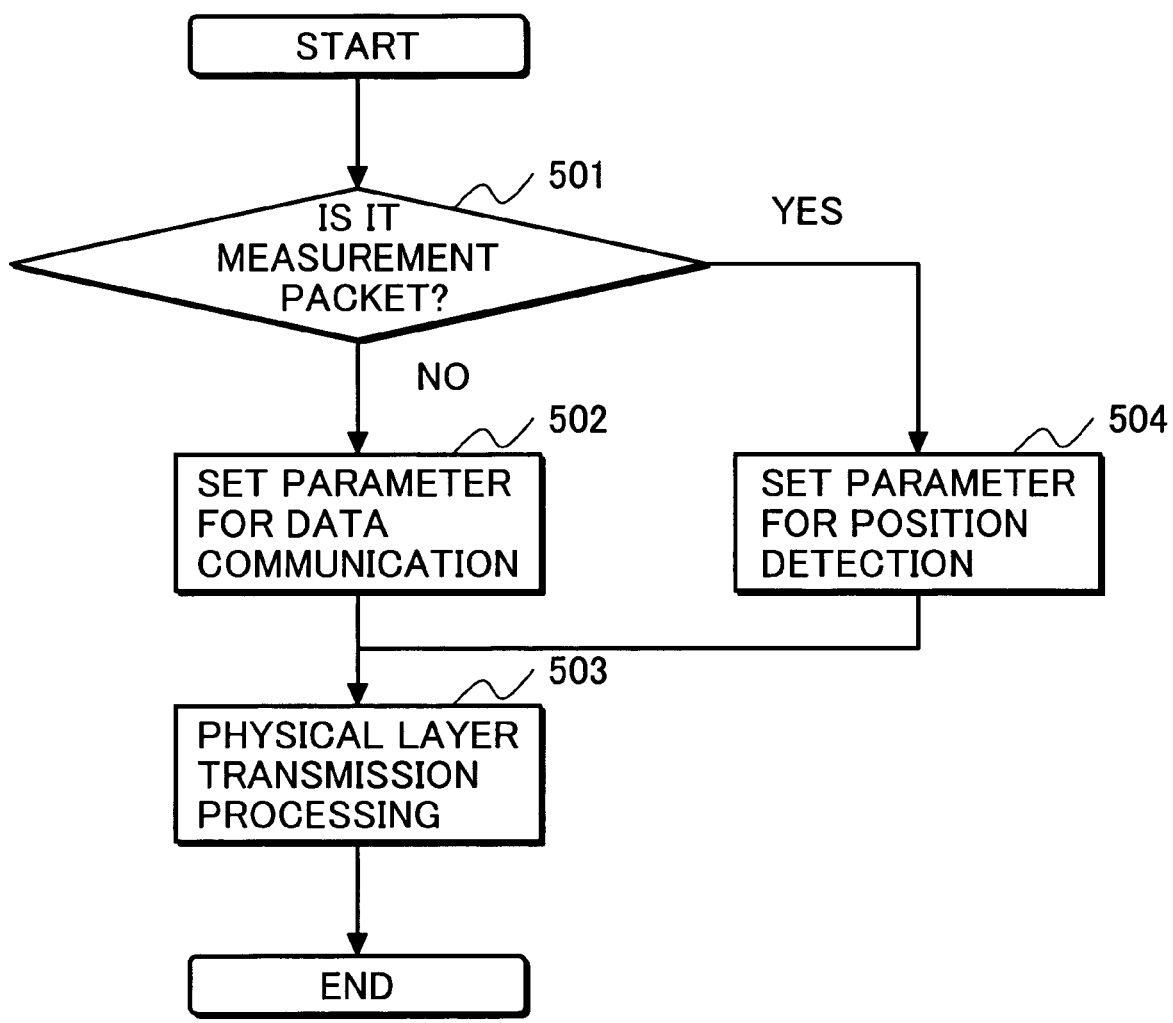
FIG. 5 is a diagram showing the flow at the time of transmission in the WLAN transceiver of the present invention in FIG. 4.

In FIG. 5, the transmission flow in WLAN transceiver 402 of the present invention is explained. In conditional branch 501, it is determined whether the packet which is input to WLAN transceiver 402 is a position detection packet. In the case of normal user data, i.e. if the packet is not a position measurement packet, parameter setting Step 502 for data communication is carried out. In the parameter settings for data communication, the data transfer rate and preamble length with which an optimal communication throughput can be obtained are set in response to the radio environment between the base station and the terminal for which the communication is bound. Also, in case the base station has a transmitted power regulation function, the transmitted power requested by the system is set.

Moreover, in the case of a position measurement packet, the service range of the radio signals becomes more important than the communication throughput. Specifically, in position measurement parameter setting Step 504, parameters are set for which the preamble length is long. Concretely, transmission is performed with parameters producing a minimal data transfer rate and a long preamble length. Also, in case the base station has a transmitted power regulation function, maximum transmitted power is set.

Figure 6:
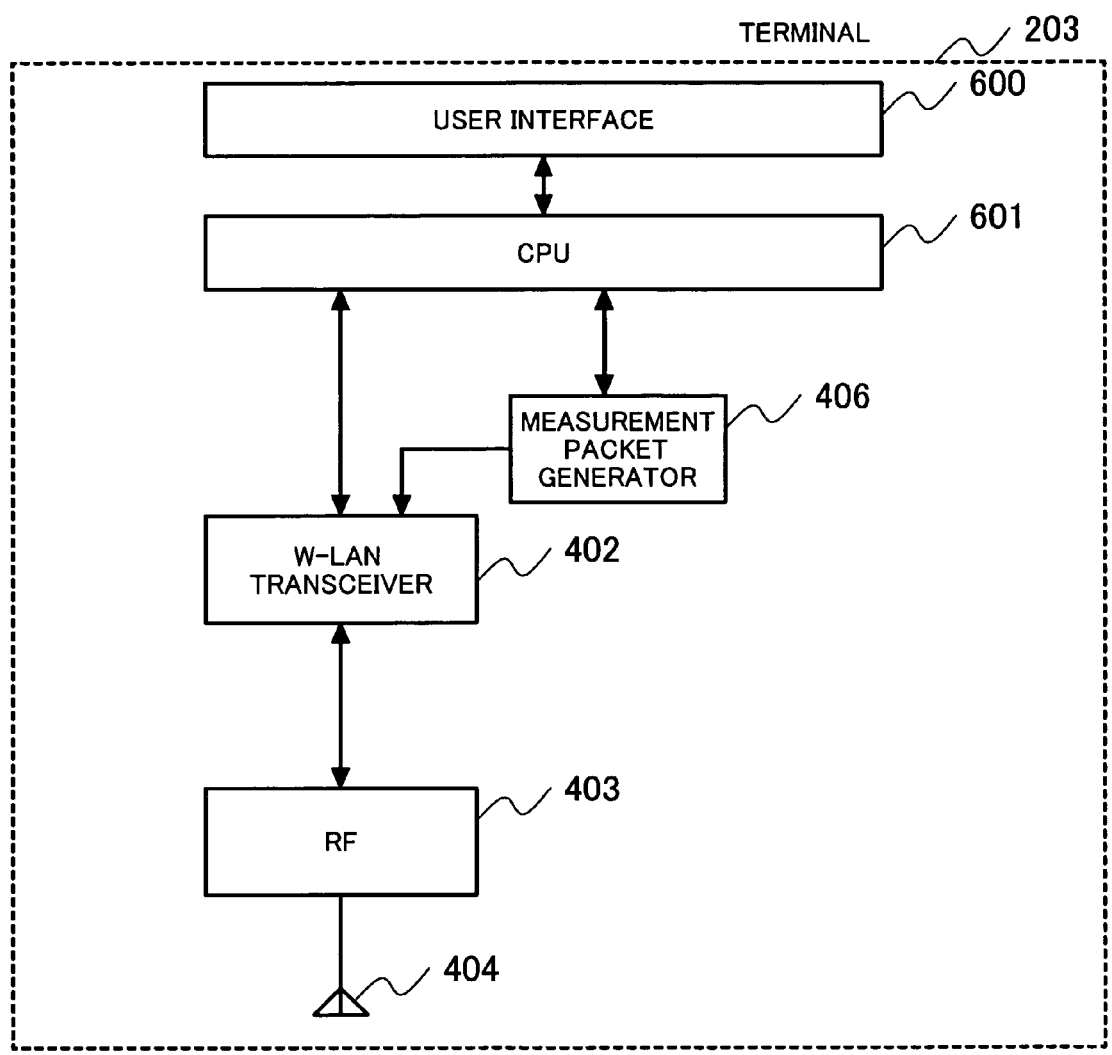
FIG. 6 is a diagram showing a configuration example for the terminal of the present invention in FIG. 1.

In FIG. 6, there is shown a configuration example of a terminal of the present invention. The terminal is composed of a user interface 600, a CPU 601 (Central Processing Unit), a WLAN transceiver 402, an RF unit 403, an antenna 404, and a measurement packet generator 406. Like reference numerals have been assigned to blocks performing the same function as blocks in the base station configuration example. User interface 600 is an element to which corresponds an input device, a display device outputting a position information service, or the like.

CPU 601 performs the control of the whole terminal. In the case of normal data communications, the route of the data goes through CPU 601, WLAN transceiver 402, RF unit 403, and antenna 404. In case a position detection measurement packet is received, CPU 601 instructs position detection controller 405 and generates a position measurement packet. The generated position measurement packet is transmitted via WLAN transmitter 402, RF unit 403, and antenna 404. At this juncture, the transmission flow explained in FIG. 5 is followed in the WLAN transceiver. The processing of each block may be implemented in hardware, software or a mixture of the two.

Also, measurement packet generator 406 may be implemented in software, and may be one part of the software operating in CPU 601. The same is also true for the WLAN transceiver.

As for the packet used as a measurement packet, a multicast or broadcast signal can be used. In particular, if a multicast or broadcast signal is chosen for measurement packet 1, it becomes possible to detect conjunctly the positions of multiple terminals transmitting measurement packets 2 in response to this signal.

Aspect 2

Figure 7:
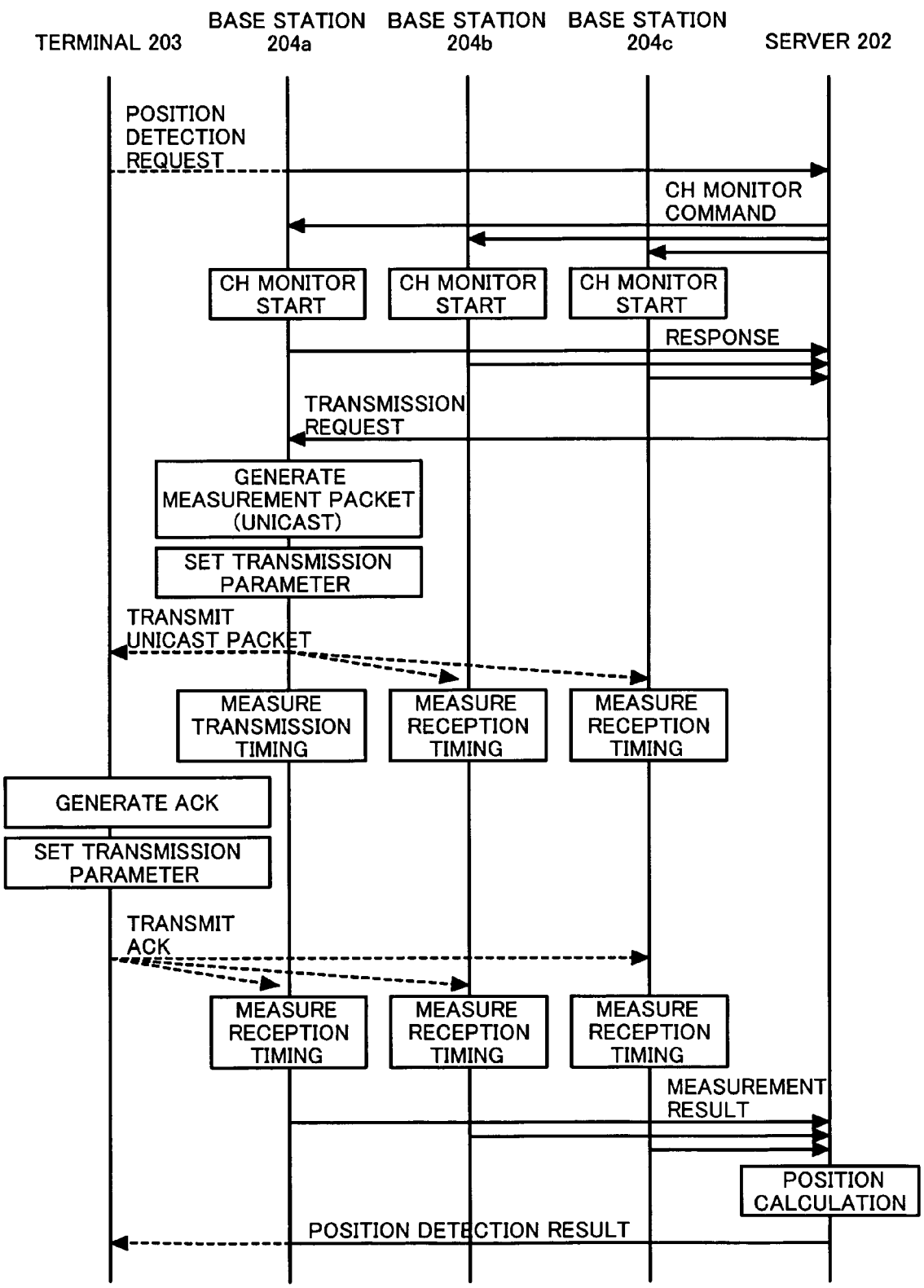
FIG. 7 is a diagram showing the system flow in the second embodiment of the present invention.

Hereinafter, the second aspect of the present invention will be explained on the basis of the accompanying drawings. In FIG. 7, the flow of a WLAN position detection system of the present invention is shown. Since the flow up to the request for transmission of measurement packet to base station 204*a* is the same as for Aspect 1, an explanation thereof will be omitted.

Base station 204*a* generates measurement packet 1. At this point, the measurement packet generated by base station 204*a* is considered as a unicast packet bound for terminal 203.

Base station 204*a* transmits the generated measurement packet 1 after having set the parameters for the position detection packet. As position measurement parameter settings, settings for which the service range is long are preferred. Specifically, in the case of an 802.11 system, settings are chosen for which the data transfer rate is the lowest and the preamble length is long. Generally, in WLAN such as one based on 802.11, the transmitted power is fixed, but in case this power can be controlled in timing, the maximum transmitted power may be chosen.

When transmitting measurement packet 1, base station 204*a* measures the transmission timing of the measurement packet. Measurement packet 1 goes through the frequency channel and arrives at the terminal or a peripheral base station. Base stations 204*b* and 204*c*, having received measurement packet 1, measure the reception timing of measurement packet 1.

In WLAN standards such as 802.11, since reliability of data transfers is provided, an ACK packet is used as an acknowledgment response.

After receiving measurement packet 1, the terminal generates an ACK packet with respect to measurement packet 1 and, after making the transmission parameter settings, returns it to base station 204*a*. The aforementioned ACK packet corresponds to measurement packet 2 in Aspect 1.

The base stations having received the aforementioned monitor command respectively measure the reception times of the aforementioned measurement packets 2. Each base station communicates the result measured for the reception time or the transmission time of each wireless packet to the server.

Figure 8:
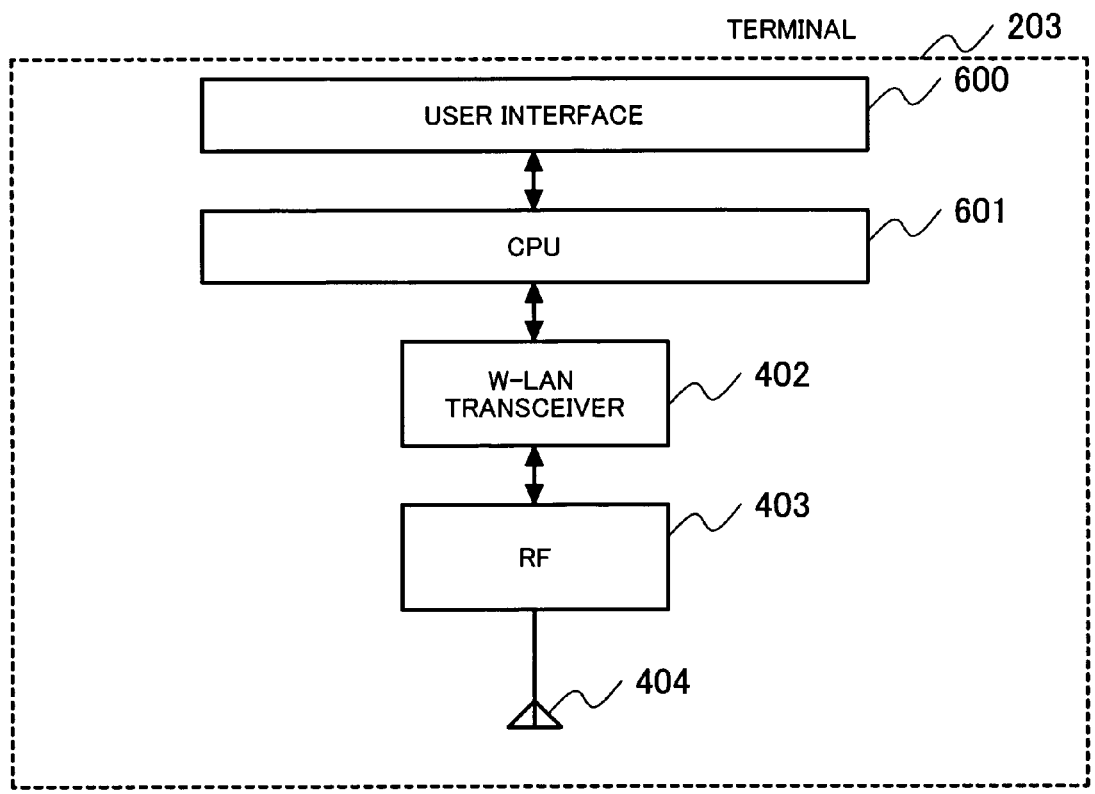
FIG. 8 is a diagram showing a configuration example for the terminal in FIG. 7.

In FIG. 8, a configuration example of a terminal of Aspect 2 is shown. Like reference numerals have been assigned to blocks performing the same processes as in FIG. 6. Since, in Aspect 2, the ACK packet provided in WLAN is used as measurement packet 2, the measurement packet generator in FIG. 6 is not needed.

Figure 9:
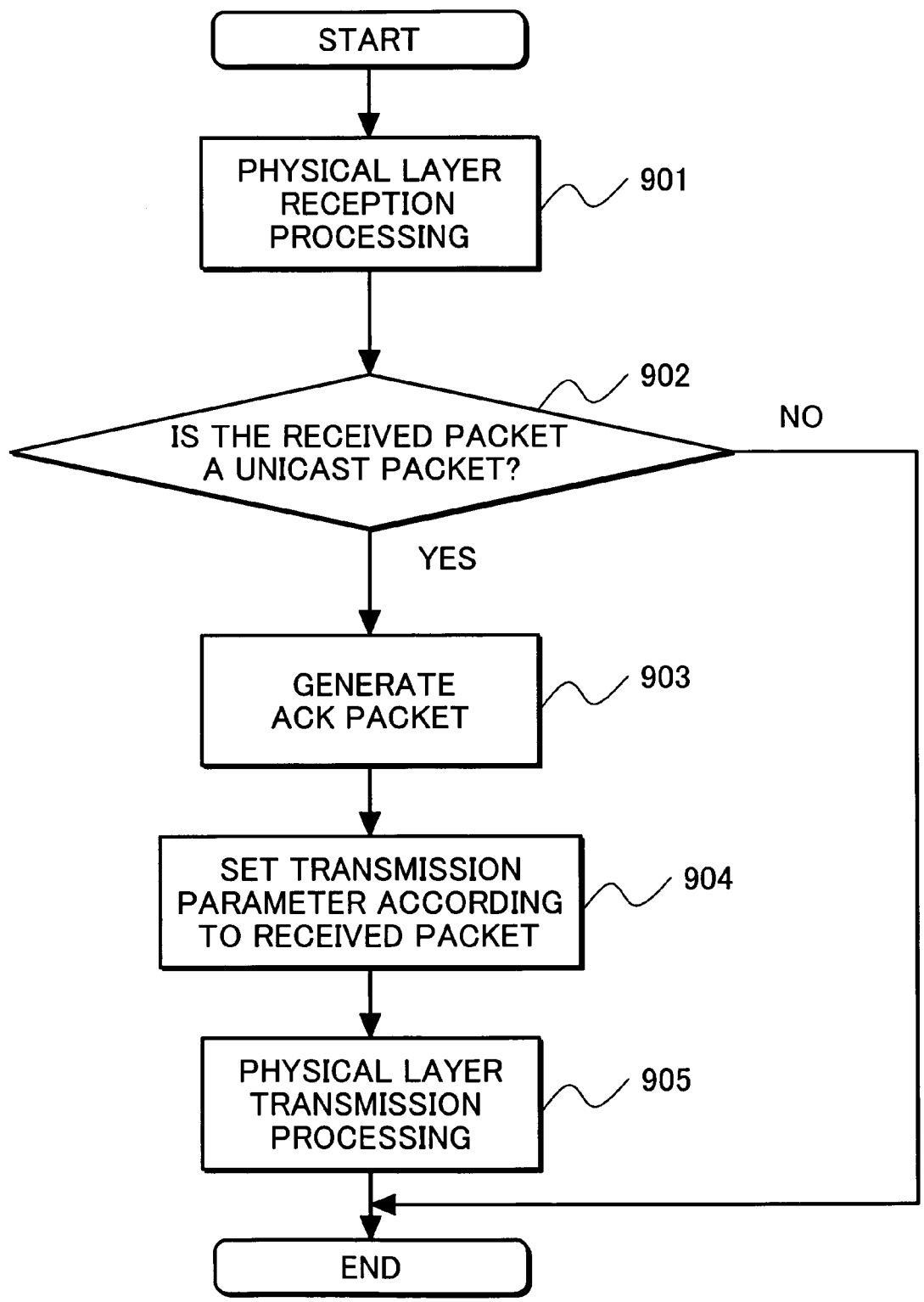
FIG. 9 is a diagram explaining the flow of transmitting a WLAN ACK packet.

In FIG. 9, an explanation is given regarding the flow of transmitting the ACK packet in the WLAN transceiver in the station having received the unicast packet. A physical layer reception processing Step 901 performs a demodulation of the physical layer of the received packet. The aforementioned physical layer reception processing Step 901 discards packets which could not be received properly due to packet collisions and the like and only sends proper packets to the higher-level layers. In case it was possible to receive the packet properly, it is determined whether the aforementioned received packet is a unicast packet by conditional branch 902. In case the aforementioned received packet is not a unicast packet, the flow comes to an end. Specifically, an ACK packet is not transmitted in this case. In case the aforementioned received packet is a unicast packet, an ACK packet is generated in ACK packet generation Step 903 with the transmission source of the aforementioned received packet as the destination.

Next, a transmission parameter setting Step 904 for the ACK packet is carried out. Here, the ACK packet is set with a data transfer rate which is the same or lower than for the received packet. Also, regarding the preamble length, it is set to be transmitted with the same length as that of the received packet. After the aforementioned transmission parameter setting, the ACK packet is transmitted by physical layer transmission processing Step 905. In the case of performing a position detection of a terminal compliant with IEEE 802.11, no special circuits or functions are needed on the side of the aforementioned terminal, since the result is the flow for the ACK packet as mentioned above.

Also, an explanation was given above regarding an exchange of unicast and ACK packets, but an exchange of similar packets may also be used as position measurement packets. E.g., an exchange of RTS (Request To Send) and CTS (Clear To Send) packets may be used.

Further, in the explanation above, an explanation was given for an example in which the base station transmits a unicast packet and the terminal transmits an ACK packet, but a packet exchange in which base station 204*a* and the terminal are interchanged may be chosen.

Figure 10:
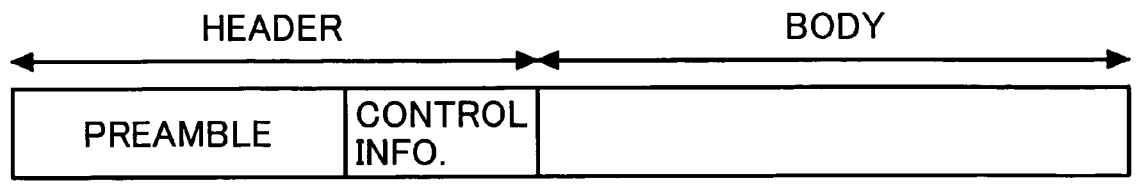
FIG. 10 is a diagram explaining the structure of a measurement packet used in the present invention.
Figure 11:
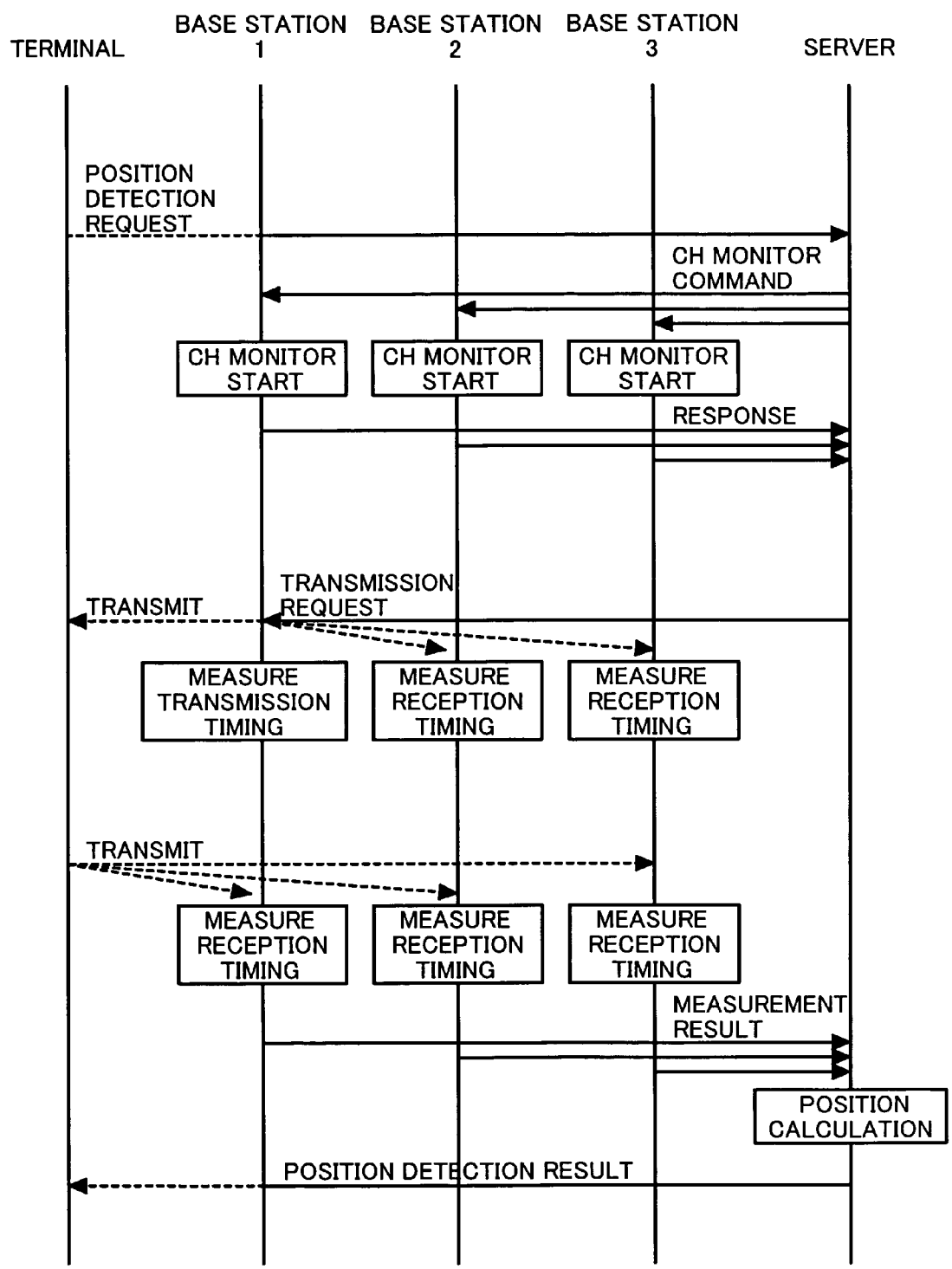
FIG. 11 is a diagram showing a conventional system flow.

Using FIG. 10, the structure of the position measurement packet signal used in Aspects 1 and 2 will be explained. An IEEE 802.11 compliant packet is composed of a header part including a preamble and control information and a body part including address information, communication data and an error detection code (Frame Check Sequence). The preamble is used for synchronization processing performed by the communication device having received the packet and is set up so that the preamble length can be selected in response to the propagation path situation and so forth. In the present invention, a preamble length is used which is longer than the preamble length required for communication with the base station which is closest to the terminal. Alternatively, the modulation method for the body part is set so that a data transfer rate comes about which is lower than the data transfer rate required for communication with the base station which is closest to the terminal. In the header part, control information indicating the modulation method for the body part is included, and the reception device performs a modulation of the body part using the control information of the header.

In the foregoing, an explanation was given assuming a system performing position detection using the reception timing of packets, but other systems may also be used, e.g. a system set up to use the received power of signals from the terminal. This is because it is necessary, even in a system like this, to be able to receive packets correctly in order to confirm that the received signal is definitely a position measurement signal. As for the communication system as well, it is not restricted to the WLAN IEEE 802.11 standard and may be another system which, in response to the propagation path situation, controls transmission parameters such as the data transfer rate, the preamble length, and the transmitted power which determine the signal propagation range. Also, even in cases other than choosing the data transfer rate to be the lowest one and the preamble length to be the longest one, if one ventures to select parameters other than the communication parameters adapted to the closest base station and it is a mode for which parameters are chosen to make the service range longer, it falls within the scope of the present invention. E.g., it is not inevitable that the lowest value for the data transfer rate is chosen.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless system including
a plurality of first wireless base stations, a plurality of second wireless base stations and a positioning server, both said first wireless base stations and said second wireless base stations being operable to perform communication with a wireless terminal via a plurality of communication channels, wherein:
said first wireless base stations transmit and receive signals for user data with a first preamble, transmit and receive signals for position detection with a second preamble having a length that is longer than a length of said first preamble,
said wireless terminal transmits and receives signals for user data with a third preamble, transmits and receives signals for position detection with a fourth preamble having a length that is longer than a length of said third preamble, and
said first wireless base stations and said wireless terminal transmit signals for position detection to said wireless terminal and at least one of said second wireless base stations,
at least one of said second wireless base stations receives signals for position detection from said first wireless base stations with the second preamble and from said wireless terminal with the fourth preamble.

2. The wireless system according to claim 1, wherein:
said first wireless base stations and said wireless terminal set a service range of said signals for position detection wider than a service range of said signals for user data.

3. The wireless system according to claim 1, wherein:
said first wireless base stations and said wireless terminal set transmission parameters for said signals for user data so that there is an optimal communication throughput between said first wireless base stations and said wireless terminal.

4. The wireless system according to claim 1, wherein:
said first wireless base stations and said wireless terminal transmit and receive, as said signals for position detection, a unicast packet, and an ACK signal in response thereto or an RTS signal, and a CTS signal in response thereto.

5. The wireless terminal according to claim 1, wherein
at least one of said second wireless base stations detect the points of time receiving the signals for position detection either from said first wireless base stations and from said a wireless terminal.

6. The wireless system according to claim 5, wherein: at least one of said second wireless base stations send the information about said points of time to said positioning server.

7. A wireless base station in a wireless system operable to perform communication with a wireless terminal via a plurality of communication channels, said wireless base station comprising:
a position detection signal generator generating signals for position detection;
a transmitter setting transmission parameters for said signals for position detection with a second preamble and signals for user data with a first preamble; and
an antenna transmitting signals for position detection and signals for user data to said wireless terminal, and signals for position detection to at least one of other wireless base stations,
wherein said transmitter sets the transmission parameters so that a length of said second preamble is longer than a length for transmitting and receiving said signals for user data of said first preamble,
said wireless terminal transmits and receives signals for user data with a third preamble, and transmits and receives signals for position detection with a fourth preamble having a length that is longer than a length of said third preamble,
said wireless base stations and said wireless terminal transmit signals for position detection to said wireless terminal and at least one of said other wireless base stations, and
at least one of said other wireless base stations receives signals for position detection from said wireless base stations with the second preamble and from said wireless terminal with the fourth preamble.

8. The wireless base station according to claim 7, wherein:
said transmitter sets said transmission parameters so that a service range of said signals for position detection becomes wider than a service range of said signals for user data.

* * * * *